United States Patent
Schaffeld

(10) Patent No.: US 9,358,627 B2
(45) Date of Patent: Jun. 7, 2016

(54) METHOD FOR MACHINING A WORKPIECE

(71) Applicant: Siemens Aktiengesellschaft, München (DE)

(72) Inventor: Richard Schaffeld, Isselburg (DE)

(73) Assignee: SIEMENS AKTIENGESELLSCHAFT, München (DE)

(*) Notice: Subject to any disclaimer, the term of this patent is extended or adjusted under 35 U.S.C. 154(b) by 397 days.

(21) Appl. No.: 13/800,710

(22) Filed: Mar. 13, 2013

(65) Prior Publication Data

US 2013/0243540 A1 Sep. 19, 2013

(30) Foreign Application Priority Data

Mar. 14, 2012 (EP) .................................... 12159484

(51) Int. Cl.
*B23F 15/06* (2006.01)
*B23F 5/16* (2006.01)

(52) U.S. Cl.
CPC ................ *B23F 15/06* (2013.01); *B23F 5/163* (2013.01); *Y10T 409/101749* (2015.01)

(58) Field of Classification Search
CPC ........... Y10T 409/103975; Y10T 409/104293; Y10T 409/105247; Y10T 409/105406; Y10T 409/105565; Y10T 409/105883; Y10T 409/106042; Y10T 409/107632; Y10T 409/10795; Y10T 407/1705; Y10T 407/1735; Y10T 407/174; Y10T 407/1745
USPC .......... 407/21, 27, 28, 29; 409/26, 28, 34, 35, 409/36, 38, 39, 49, 51
See application file for complete search history.

(56) References Cited

U.S. PATENT DOCUMENTS

| | | | | |
|---|---|---|---|---|
| 2,308,891 | A | | 1/1943 | Miller |
| 2,598,327 | A | * | 5/1952 | Wildhaber ..................... 409/36 |
| 3,089,392 | A | * | 5/1963 | Romi ............................. 409/36 |
| 3,399,599 | A | * | 9/1968 | Looman et al. ................ 409/34 |
| 2008/0266750 | A1 | | 10/2008 | Folprecht |
| 2012/0003058 | A1 | * | 1/2012 | Hutter et al. .................... 409/26 |
| 2012/0148360 | A1 | * | 6/2012 | Heinemann et al. ............ 409/12 |

FOREIGN PATENT DOCUMENTS

| | | |
|---|---|---|
| DE | 10305752 A1 | 10/2004 |
| DE | 102007015357 A1 | 10/2008 |
| DE | 102009003601 A1 | 9/2010 |

OTHER PUBLICATIONS

Hünecke C: "Reliable and efficient skiving", Gear Technology, Randall Publishing Co. Elk Grove, Illinois, US, Sep. 1, 2011, pp. 11-13, XP007920036, ISSN: 0743-6858; 2011; Sep. 1, 2011.

* cited by examiner

*Primary Examiner* — Sunil K Singh
*Assistant Examiner* — Alan Snyder
(74) *Attorney, Agent, or Firm* — Henry M. Feiereisen LLC

(57) ABSTRACT

In a method for machining a workpiece, an end face gearing is created on the end face of the workpiece by hob peeling. The workpiece is rotated about the Z axis in relation to a coordinate system with X, Y and Z axes arranged perpendicularly to one another. During creation of the end face gearing, the feed direction of the hob peeling tool encloses with the axis of rotation of the hob peeling tool an angle which is greater than 0° and less than 35°. The hob peeling tool is arranged in the X-Z plane at an angle to the X axis which is greater than 0° and less than 20°.

9 Claims, 5 Drawing Sheets

METHOD FOR MACHINING A WORKPIECE

CROSS-REFERENCES TO RELATED APPLICATIONS

This application claims the priority of European Patent Application, Serial No. 12159484.0, filed Mar. 14, 2012, pursuant to 35 U.S.C. 119(a)-(d), the content of which is incorporated herein by reference in its entirety as if fully set forth herein.

BACKGROUND OF THE INVENTION

The present invention relates to a method for machining a workpiece.

The following discussion of related art is provided to assist the reader in understanding the advantages of the invention, and is not to be construed as an admission that this related art is prior art to this invention.

Workpieces are known which are provided with an end face gearing on the end face. Such end face gearings are for example used to mesh components, which are axially aligned to one another, with one another in rotationally fixed fashion in the manner of a coupling. There are various ways to produce an end face gearing on the end face of a workpiece. In principle a distinction can be made here between intermittent partial processes and continuous processes. In intermittent partial processes a single tooth gap of the workpiece is machined in each case with the tool. On completion of the tooth gap, workpiece and tool are then rotated relative to one another in line with the pitch of the gear wheel to be manufactured, whereupon the machining of the next tooth gap can be effected. In this way a gear wheel is gradually manufactured. Although manufacturing an end face gearing using intermittent partial processes does take a great deal of time, nevertheless these processes can usually be used very flexibly. In contrast, continuous processes are based on linked sequences of movements between workpiece and tool, as a result of which a continuous pitch movement and thus a shorter machining time are achieved. An example of such a continuous process is for example the hobbing process. However, one problem with the known continuous processes which are currently used to create an end face gearing on the end face of a workpiece is that they can only be performed on special gearing machines. As a result, investment costs are high and in addition further machining of the workpieces is required on additional machine tools, making it necessary to rechuck the workpiece. However, rechucking is associated with impaired quality, in particular as regards rotational accuracy, and with longer throughput times.

It would be desirable and advantageous to provide an improved method for machining a workpiece to obviate prior art shortcomings and to attain short machining times, short throughput times and high rotational accuracies while still incurring low investment costs.

SUMMARY OF THE INVENTION

According to one aspect of the present invention, method for machining a workpiece includes rotating a workpiece about a Z axis of a coordinate system with X, Y and Z axes arranged perpendicularly to one another, arranging a hob peeling tool in an X-Z plane at an angle to the X axis which is greater than 0° and less than 20°, and feeding the hob peeling tool in a direction of the workpiece to provide an end face of the workpiece with an end face gearing by hob peeling, with the feeding direction of the hob peeling tool enclosing with an axis of rotation of the hob peeling tool an angle which is greater than 0° and less than 35°.

Hob peeling is in principle known as a manufacturing process for manufacturing gearings on workpieces. It is one of the group of continuous gear wheel manufacturing processes with geometrically defined cutting edges. In hob peeling, the axis of rotation of the hob peeling tool is inclined to the tool feed direction at an angle which is not equal to 0. The resulting relative movement between the workpiece and the tool corresponds to a screw movement which can be split into a rotational part and a thrust part, wherein the thrust part is used to implement the cutting movement. Hob peeling is however at present used exclusively to provide rotationally symmetrical workpieces with external or internal gearing along their circular external or internal circumference. Studies by applicant have surprisingly shown that hob peeling can alternatively also be used to create end face gearing on the end face of a workpiece, wherein the end face is preferably embodied as annular and flat. The use of hob peeling is associated in particular with the advantage of very short machining times. It can be performed on a conventional turning/milling center, so that many different types of machining can be implemented in a single workpiece clamping operation. As a result short throughput times, very good rotational properties of the workpiece and high machine utilization can be achieved. Moreover it is not necessary to purchase a separate gearing machine, resulting in low investment costs.

According to another advantageous feature of the present invention, the angle between the feeding direction and the axis of rotation can range between 15° and 25°.

According to another advantageous feature of the present invention, the hob peeling tool can have a plurality of longitudinal cutting edges arranged about a circumference of the hob peeling tool. The cutting edges of the hob peeling tool are advantageously spaced apart from one another in the circumferential direction, wherein the respective distances in the circumferential direction each correspond to a whole-number multiple of a cutting edge width. In this way undesired collisions between the workpiece and the hob peeling tool can be prevented as a function of the gearing to be manufactured.

According to another advantageous feature of the present invention, at least one further machining of the workpiece may be carried out on the same machine tool while retaining the workpiece clamping, in particular turning and/or milling and/or drilling, in addition to the creation of the end face gearing. The performance of multiple machining steps on the same machine tool while retaining the workpiece clamping is associated with short machining times, short throughput times and high rotational accuracy.

According to another advantageous feature of the present invention, the method can be performed on a turning/milling center. Accordingly it is not necessary to purchase a separate gearing machine, and hence the investment costs can be kept low.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
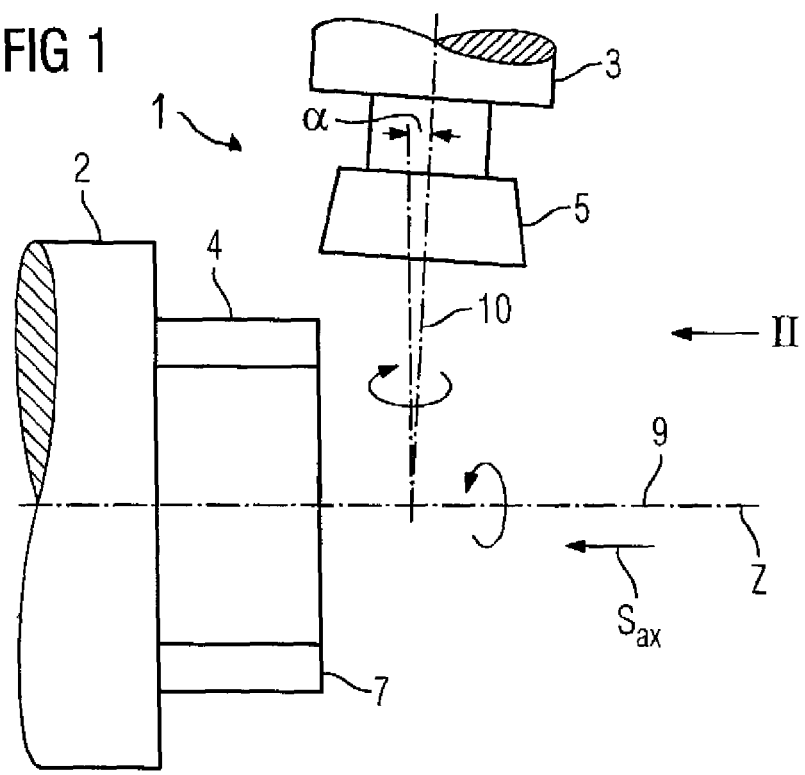
FIG. 1 shows a schematic front view of components of a turning/milling center for manufacturing an end face gearing on an end face of a workpiece in accordance with the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
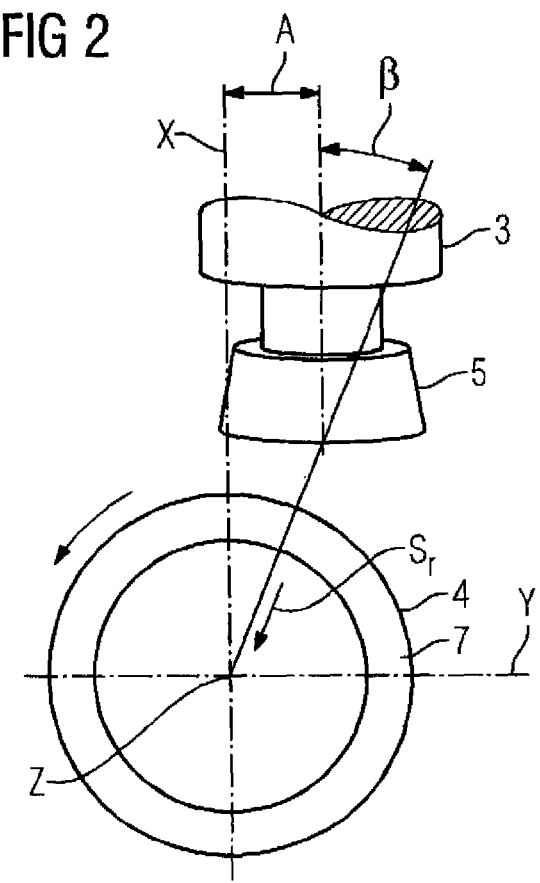
FIG. 2 shows a schematic view of the turning/milling center in a direction of arrow II in FIG. 1.

Turning now to the drawing, and in particular to FIGS. 1 and 2, there are shown schematic illustrations of a turning/milling center 1 with the axes X, Y and Z. The turning/milling center 1 has a main spindle 2 and a milling spindle 3. The main spindle 2 is provided with a chuck for accommodating a workpiece 4, and the milling spindle 3 is provided with a chuck for accommodating a hob peeling tool 5. Alternatively the chuck of the milling spindle 3 can of course also accommodate a milling or drilling tool. The turning/milling center 1 further includes, in known fashion, a slide (not shown in greater detail) with a tool revolver for accommodating different turning tools, so that turning operations can be performed on the turning/milling center 1. The main spindle 2 and the milling spindle 3 can be controlled such that they can be rotated synchronously with one another. The milling spindle 3 can move steplessly in the X, Y and Z direction.

Figure 3:
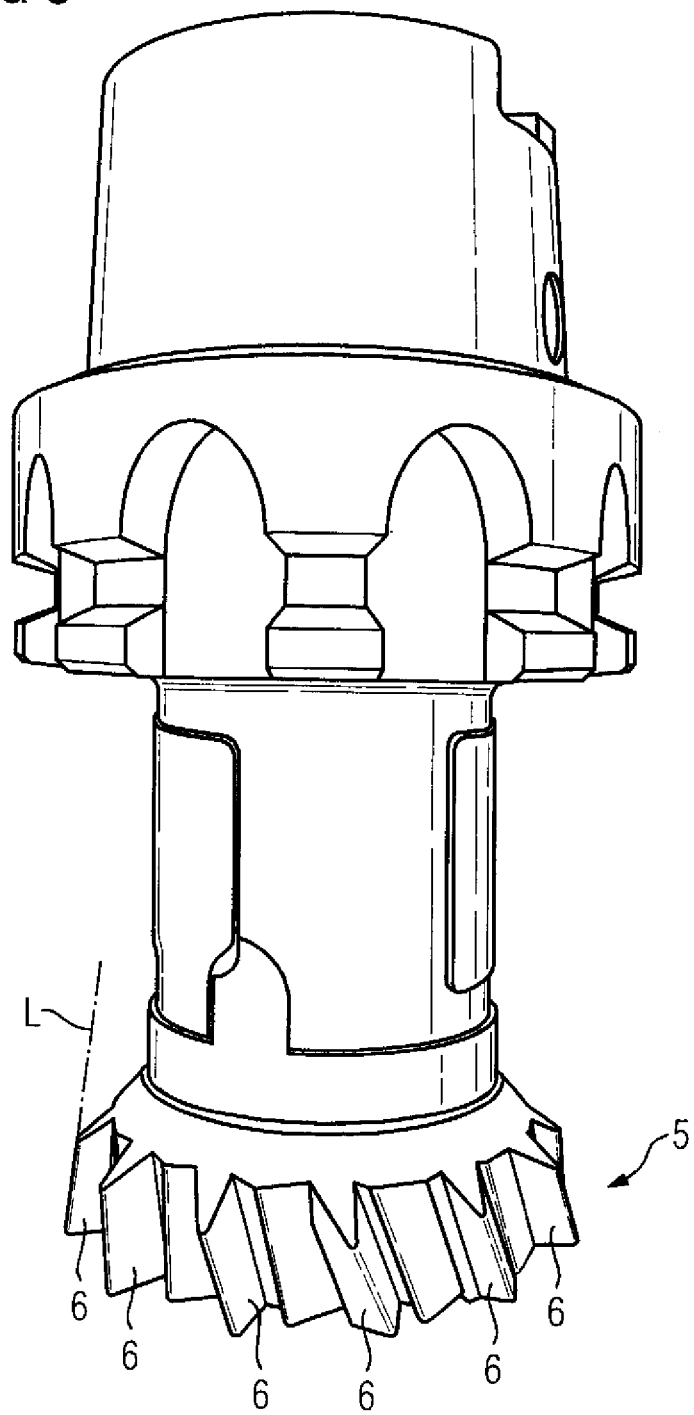
FIG. 3 shows a side view of an embodiment of a hob peeling tool which can be used in the execution of the method according to the present invention.
Figure 4:
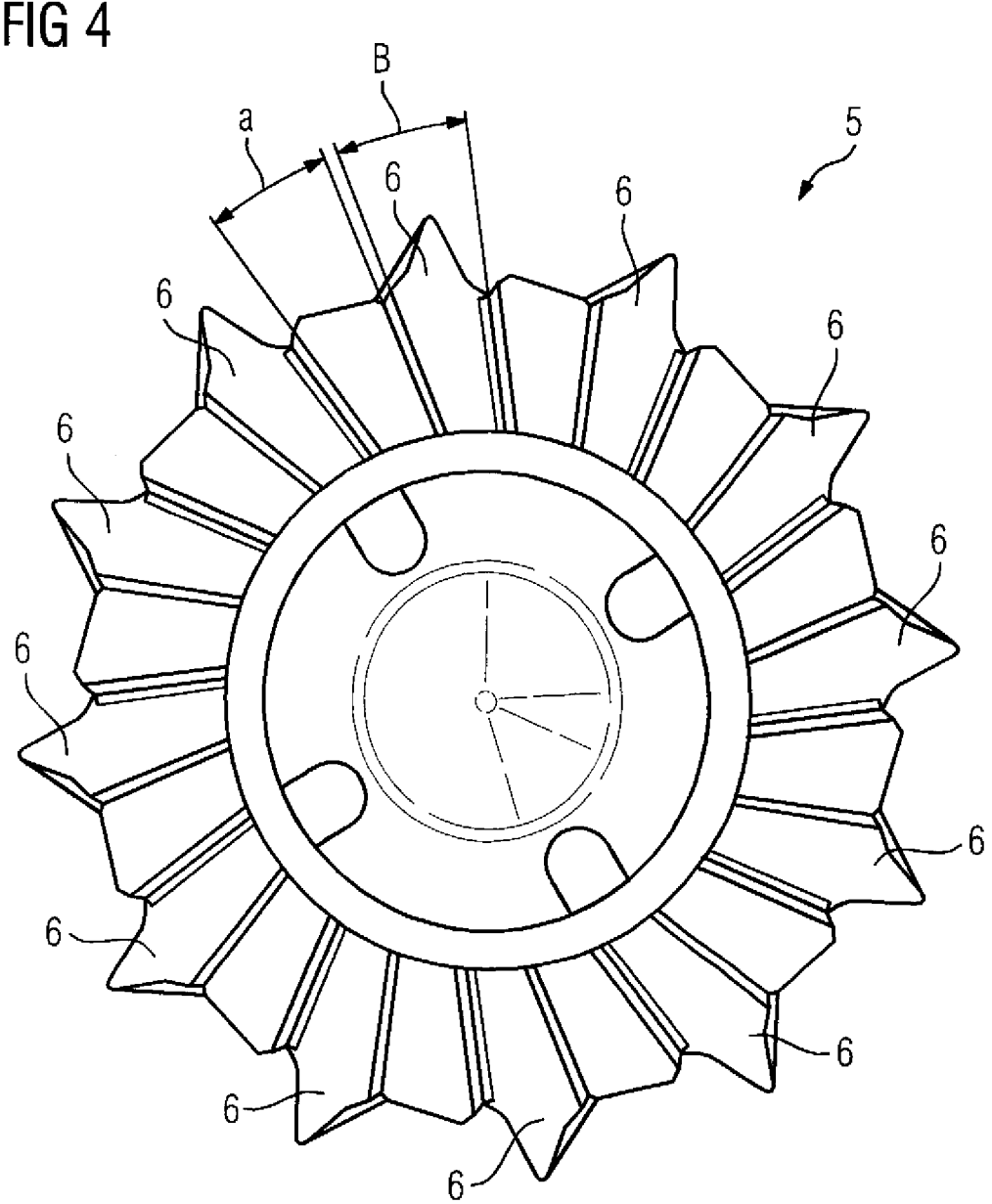
FIG. 4 shows a bottom view of the hob peeling tool of FIG. 3.

The hob peeling tool 5 is shown in greater detail in FIGS. 3 and 4. The hob peeling tool 5 is provided with a plurality of circumferentially arranged, longitudinally embodied and radially projecting cutting edges 6. The cutting edges 6 of the hob peeling tool 5 are spaced apart from one another in the circumferential direction, wherein the respective distances a in the circumferential direction correspond to a whole-number multiple of a cutting edge width B. In other words in this case a cutting edge 6 is in each case omitted between two adjacent cutting edges 6.

Figure 5:
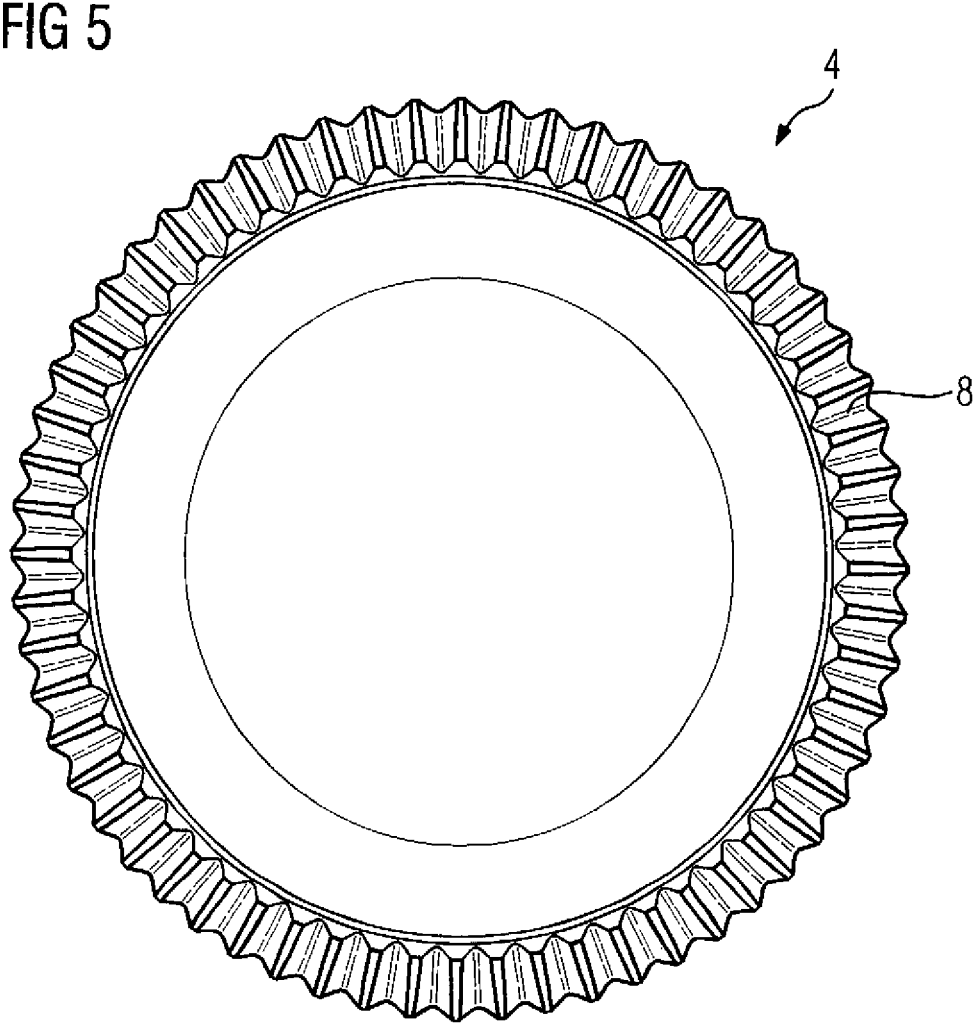
FIG. 5 shows a top view of a workpiece which is provided on its end face with an end face gearing manufactured with the hob peeling tool shown in FIGS. 3 and 4.
Figure 6:
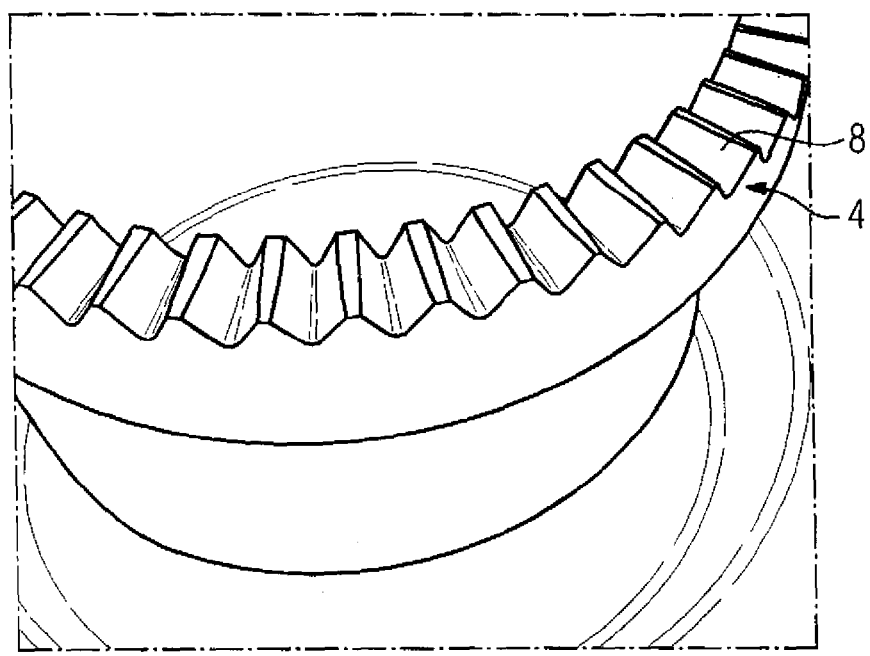
FIG. 6 shows a perspective partial side view of the workpiece shown in FIG. 5.

In order to provide the planarly embodied end face 7 of the workpiece 4, accommodated on the main spindle 2 and by way of example of cylindrical configuration, with an end face gearing 8 by hob peeling in accordance with the invention, the milling spindle 3 and thus the axis of rotation 10 of the hob peeling tool 5 are arranged as a function of the desired tooth bearing of the gearing to be created in the X-Z plane at an angle α to the X axis, as shown in FIG. 2, wherein α is normally greater than 0° and less than 20°. Furthermore the milling spindle 3 is positioned such that the axis of rotation 10 of the hob peeling tool 5 is positioned in the Y direction offset by a distance A to the X axis. In other words the hob peeling tool 5 is arranged off-center in respect of the workpiece 4 in the Y direction. During hob peeling the hob peeling tool 5 is moved relative to the workpiece 4 with a radial feed $S_r$, both in the X and in the Y direction, while the workpiece 4 and the hob peeling tool 5 are rotated synchronously about their respective axes of rotation 9 and 10. The feed direction of the hob peeling tool 5 thus encloses an angle β with the axis of rotation 10 of the hob peeling tool 5, wherein β is greater than 0° and less than 35° and in particular lies in the range between 15° and 25°. The angle β determines the cutting speed with which the workpiece 4 is machined. Furthermore an axial feed $S_{ax}$ can be executed in the Z direction as an infeed movement. In this way the end face gearing 7 is created on the end face 6 of the workpiece 4 corresponding to the shape of the hob peeling tool 5, as shown in FIGS. 5 and 6, wherein the tops of the tooth crests of the finished end face gearing 7 lie in a common plane.

Figure 7:
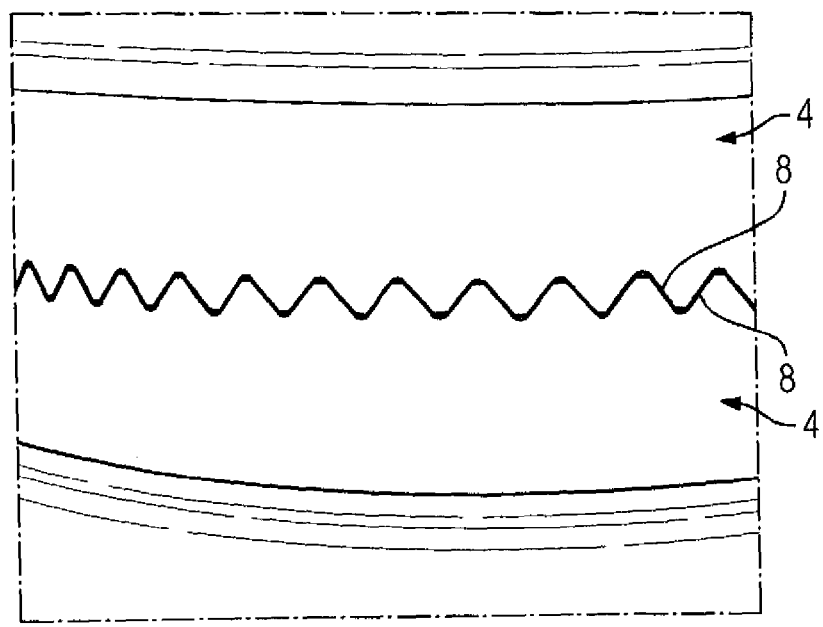
FIG. 7 shows a perspective partial side view of two workpieces illustrated in FIGS. 5 and 6, which are aligned axially to another and having end face gearings meshing with one another in the manner of a coupling.

FIG. 7 shows two identically embodied workpieces 4, which have each been inventively provided with an end face gearing 8 using the hob peeling process. The workpieces 4 are axially aligned to one another and arranged such that their end face gearings 8 mesh with one another in the manner of a coupling.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A method for machining a workpiece, comprising:
rotating a workpiece about a Z axis of a coordinate system with X, Y and Z axes arranged perpendicularly to one another;
arranging a hob peeling tool in an X-Z plane at an angle to the X axis which is greater than 0° and less than 20°;
positioning a milling spindle, which accommodated the hob peeling tool such that the axis of rotation of the hob peeling tool is positioned in the Y direction offset by a distance to the X axis; and
feeding the hob peeling tool in a radial direction of the workpiece to provide an end face of the workpiece with an end face gearing by hob peeling, with the feeding direction of the hob peeling tool enclosing with an axis of rotation of the hob peeling tool an angle which is greater than 0° and less than 35°.

2. The method of claim 1, wherein the angle between the feeding direction and the axis of rotation ranges between 15° and 25°.

3. The method of claim 1, wherein the end face of the workpiece is configured as annular and flat.

4. The method of claim 1, wherein the hob peeling tool has a plurality of longitudinal cutting edges arranged about a circumference of the hob peeling tool.

5. The method of claim 4, wherein the cutting edges of the hob peeling tool are spaced apart from one another in a circumferential direction at distances which correspond to a whole-number multiple of a cutting edge width.

6. The method of claim 1, further comprising maintaining the workpiece in a clamped position in the hob peeling tool, and subjecting the workpiece to a further machining step by the hob peeling tool in addition to a formation of the end face gearing.

7. The method of claim 6, wherein the additional machining step includes at least one of turning, milling, and drilling.

8. The method of claim 1, wherein the hob peeling tool is part of a turning/milling center.

9. The method of claim 1, wherein the hob peeling tool moves in a radial direction in relation to the workpiece.

* * * * *